(12) United States Patent
Yotsutsuji et al.

(10) Patent No.: US 9,436,141 B2
(45) Date of Patent: Sep. 6, 2016

(54) FIXING DEVICE COMPRISING CONTROLLER WHICH JUDGES WHETHER OR NOT FIXING BELT IS ROTATING AND IMAGE FORMING APPARATUS INCLUDING SAME

(71) Applicant: KYOCERA Document Solutions Inc., Osaka-shi, Osaka (JP)

(72) Inventors: Takefumi Yotsutsuji, Osaka (JP); Yoshihiro Yamagishi, Osaka (JP); Takashi Eiki, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/994,751

(22) Filed: Jan. 13, 2016

(65) Prior Publication Data
US 2016/0216665 A1    Jul. 28, 2016

(30) Foreign Application Priority Data
Jan. 22, 2015  (JP) ................................. 2015-010006

(51) Int. Cl.
G03G 15/20    (2006.01)
(52) U.S. Cl.
CPC ........ G03G 15/2039 (2013.01); G03G 15/205 (2013.01); G03G 15/2053 (2013.01); B65G 2811/093 (2013.01); G03G 2215/00156 (2013.01); G03G 2215/2016 (2013.01)
(58) Field of Classification Search
CPC ........... G03G 15/2053; G03G 15/205; G03G 15/2039; G03G 2215/00139; G03G 2215/00156; G03G 2215/2016; B65G 43/02; B65G 2203/0291; B65G 2203/045; B65G 2811/093
USPC .......... 399/33, 69, 329; 219/216; 198/502.4, 198/810.01, 810.02, 810.03
See application file for complete search history.

(56) References Cited

U.S. PATENT DOCUMENTS

2013/0094869 A1*   4/2013  Lee .................... G03G 15/2053
                                                                 399/33

FOREIGN PATENT DOCUMENTS

| JP | 2009251253 A | * | 10/2009 |
| JP | 2010-072480 A |   | 4/2010 |
| JP | 2013037068 A | * | 2/2013 |

* cited by examiner

Primary Examiner — Robert Beatty
(74) Attorney, Agent, or Firm — Studebaker & Brackett PC

(57)     ABSTRACT

A fixing device includes a fixing belt, a pressuring member, a heat source, a pressing member, a temperature sensor and a controller. A detected region whose temperature is detected by the temperature sensor is formed in the fixing belt, and an elastic layer of the detected region is provided with a hole in a part thereof in a circumferential direction. The controller judges that the fixing belt is rotating in a case where the temperature detected by the temperature sensor alternately increases and decreases in a state that the heat source is heating the fixing belt, and judges that the fixing belt is not rotating in a case where the temperature detected by the temperature sensor does not alternately increase and decrease in the state that the heat source is heating the fixing belt.

12 Claims, 9 Drawing Sheets

FIXING DEVICE COMPRISING CONTROLLER WHICH JUDGES WHETHER OR NOT FIXING BELT IS ROTATING AND IMAGE FORMING APPARATUS INCLUDING SAME

INCORPORATION BY REFERENCE

This application is based on and claims the benefit of priority from Japanese Patent application No. 2015-010006 filed on Jan. 22, 2015, the entire contents of which are incorporated herein by reference.

BACKGROUND

The present disclosure relates to a fixing device configured to fix a toner image onto a recording medium and an image forming apparatus including the fixing device.

Conventionally, an electrographic image forming apparatus, such as a copying machine or a printer, includes a fixing device configured to fix a toner image onto a recording medium, such as a sheet.

For example, there is a fixing device including a fixing belt, a pressuring member configured to come into pressure contact with the fixing belt so as to form a fixing nip, a heat source configured to heat the fixing belt and a pressing member configured to press the fixing belt to a side of the pressuring member.

In such a fixing device, in a case where the heat source heats the fixing belt in a state that the fixing belt is not rotating, there is a risk that the temperature of the fixing belt excessively rises. Therefore, the above-mentioned fixing device is provided with a rotation detecting means configured to detect a rotation state of the fixing belt. The rotation detecting means includes a roller configured to be co-rotated with the rotation of the fixing belt, a rotation transmitting device configured to output a rotation of the fixing belt with an increased state by using a rotation of the roller as an input, and a photo sensor configured to detect the rotation state of the fixing belt based on the output of the rotation transmitting device.

In the fixing device configured as described above, the rotation detecting means requires the roller and the rotation transmitting device in addition to the photo sensor, which leads to a complicated configuration of the rotation detecting means.

SUMMARY

In accordance with an embodiment of the present disclosure, a fixing device includes a fixing belt, a pressuring member, a heat source, a pressing member, a temperature sensor and a controller. The fixing belt is configured to be rotatable. The pressuring member is configured to be rotatable and to come into pressure contact with the fixing belt so as to form a fixing nip. The heat source is configured to heat the fixing belt. The pressing member is configured to press the fixing belt to a side of the pressuring member. The temperature sensor is configured to detect a temperature of the fixing belt. Into the controller, the temperature detected by the temperature sensor is inputted. The fixing belt includes a base material layer and an elastic layer provided around the base material layer. The detected region whose temperature is detected by the temperature sensor is formed in the fixing belt, and the elastic layer of the detected region is provided with a hole in a part thereof in a circumferential direction. The controller judges that the fixing belt is rotating in a case where the temperature detected by the temperature sensor alternately increases and decreases in a state that the heat source is heating the fixing belt, and judges that the fixing belt is not rotating in a case where the temperature detected by the temperature sensor does not alternately increase and decrease in the state that the heat source is heating the fixing belt.

In accordance with an embodiment of the present disclosure, an image forming apparatus includes the above-mentioned fixing device.

The above and other objects, features, and advantages of the present disclosure will become more apparent from the following description when taken in conjunction with the accompanying drawings in which a preferred embodiment of the present disclosure is shown by way of illustrative example.

DETAILED DESCRIPTION

Figure 1:
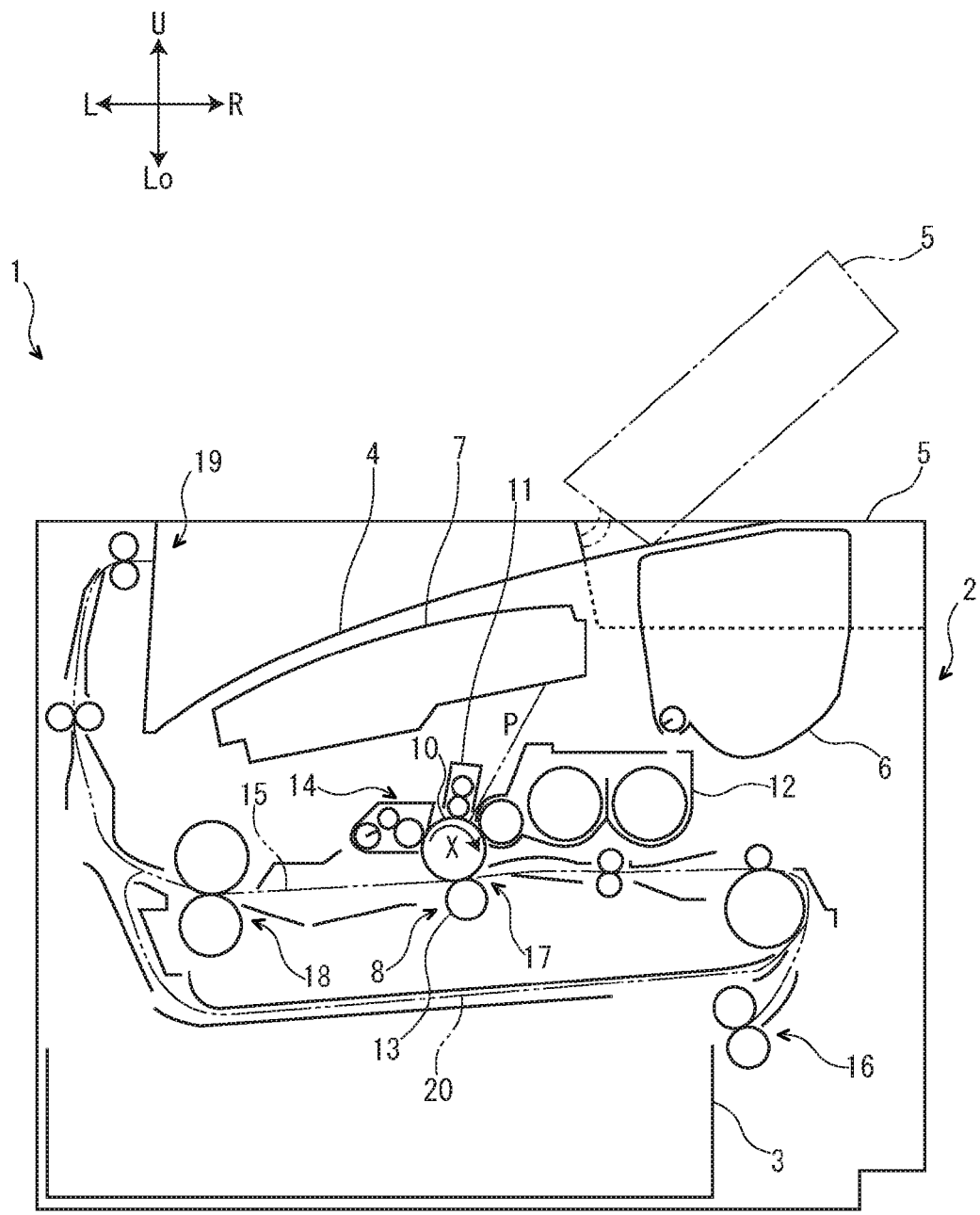
FIG. 1 is a schematic diagram showing a printer according to one embodiment of the present disclosure.

First, with reference to FIG. 1, the entire structure of an electrographic printer 1 (an image forming apparatus) will be described. Hereinafter, it will be described so that the front side of the printer 1 is positioned at the front side of FIG. 1. Arrows Fr, Rr, L, R, U and Lo appropriately added to each of the drawings indicate the front side, rear side, left side, right side, upper side and lower side of the printer 1, respectively.

The printer 1 includes a box-formed printer main body 2. In a lower part of the printer main body 2, a sheet feeding cartridge 3 configured to store sheets (recording medium) is installed and, on the top surface of the printer main body 2, a sheet ejecting tray 4 is mounted. On the top surface of the printer main body 2, an upper cover 5 is openably/closably attached at a right side of the sheet ejecting tray 4 and, below the upper cover 5, a toner container 6 is installed.

In an upper part of the printer main body 2, an exposure device 7 composed of a laser scanning unit (LSU) is installed below the sheet ejecting tray 4. Below the exposure device 7, an image forming unit 8 is installed. In the image forming unit 8, a photosensitive drum 10 as an image carrier is rotatably installed. Around the photosensitive drum 10, a charger 11, a development device 12, a transfer roller 13 and a cleaning device 14 are located along a rotating direction (refer to arrow X in FIG. 1) of the photosensitive drum 10.

Inside the printer main body 2, a sheet conveying path 15 is arranged. At an upper stream end of the conveying path 15, a sheet feeder 16 is positioned. At an intermediate stream part of the conveying path 15, a transferring unit 17 constructed of the photosensitive drum 10 and transfer roller 13 is positioned. At a lower stream part of the conveying path 15, a fixing device 18 is positioned. At a lower stream end of the conveying path 15, a sheet ejecting unit 19 is positioned. Below the conveying path 15, an inversion path 20 for duplex printing is arranged.

Next, the operation of forming an image by the printer 1 having such a configuration will be described.

When the power is supplied to the printer 1, various parameters are initialized and initial determination, such as temperature determination of the fixing device 18, is carried out. Subsequently, in the printer 1, when image data is inputted and a printing start is directed from a computer or the like connected with the printer 1, image forming operation is carried out as follows.

First, the surface of the photosensitive drum 10 is electrically charged by the charger 11. Then, exposure corresponding to the image data on the photosensitive drum 10 is carried out by a laser (refer to two-dot chain line P in FIG. 1) from the exposure device 7, thereby forming an electrostatic latent image on the surface of the photosensitive drum 10. Subsequently, the electrostatic latent image is developed to a toner image with a toner (a developer) in the development device 12.

On the other hand, a sheet fed from the sheet feeding cartridge 3 by the sheet feeder 16 is conveyed to the transferring unit 17 in a suitable timing for the above-mentioned image forming operation, and then, the toner image on the photosensitive drum 10 is transferred onto the sheet in the transferring unit 17. The sheet with the transferred toner image is conveyed to a lower stream on the conveying path 15 to go forward to the fixing device 18, and then, the toner image is fixed on the sheet in the fixing device 18. The sheet with the fixed toner image is ejected from the sheet ejecting unit 19 to the sheet ejecting tray 4. Toner remained on the photosensitive drum 10 is collected by the cleaning device 14.

Next, the fixing device 18 will be described in detail with reference to FIGS. 2 to 5. Arrow Y in FIG. 2 indicates a sheet conveying direction. Arrow I in FIGS. 4 and 5 indicates an inside in front and rear directions, and arrow O in FIGS. 4 and 5 indicates an outside in the front and rear directions.

Figure 2:
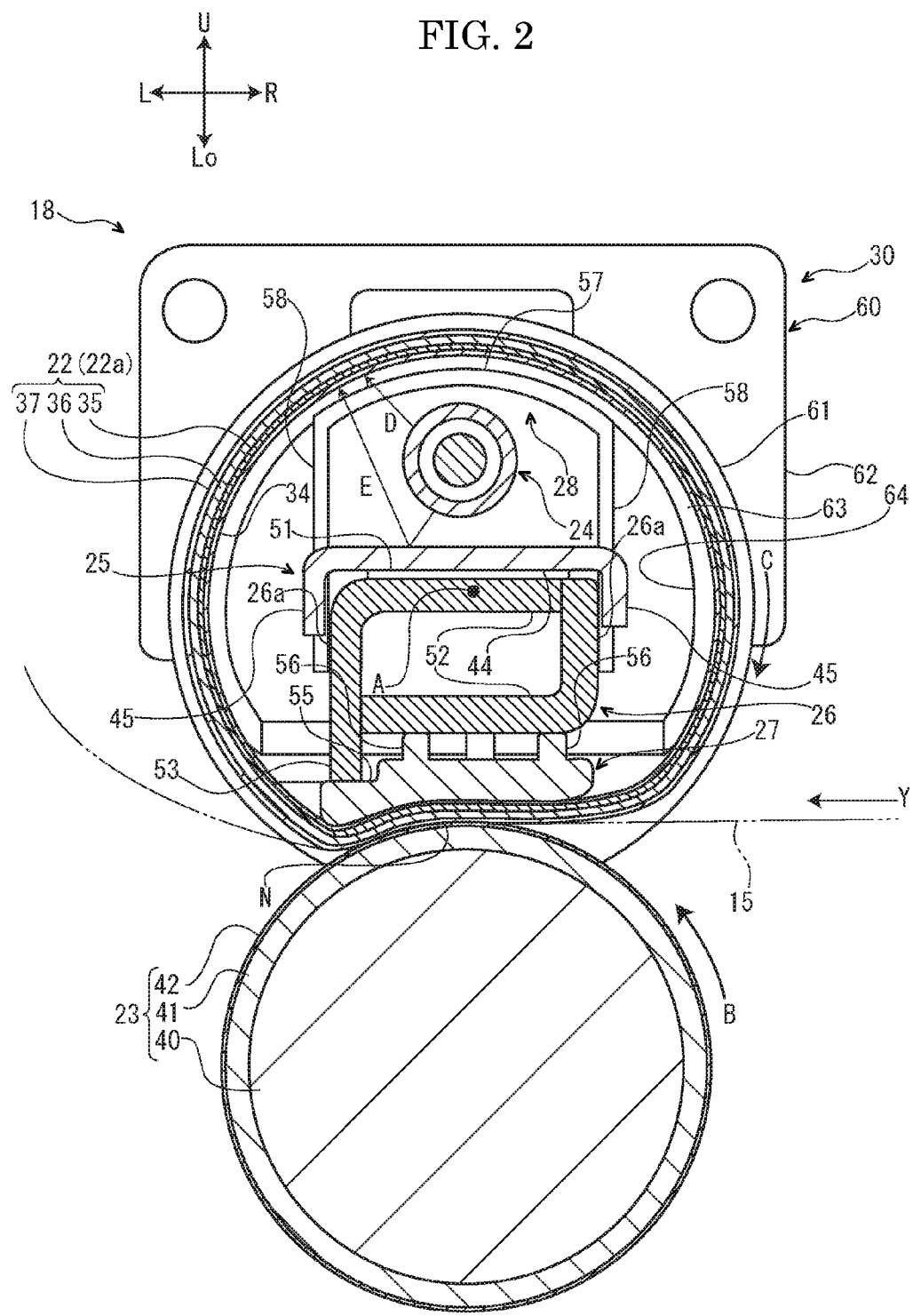
FIG. 2 is a sectional view in a cross section crossing a sheet passing region of a fixing belt in a fixing device according to the one embodiment of the present disclosure.
Figure 3:
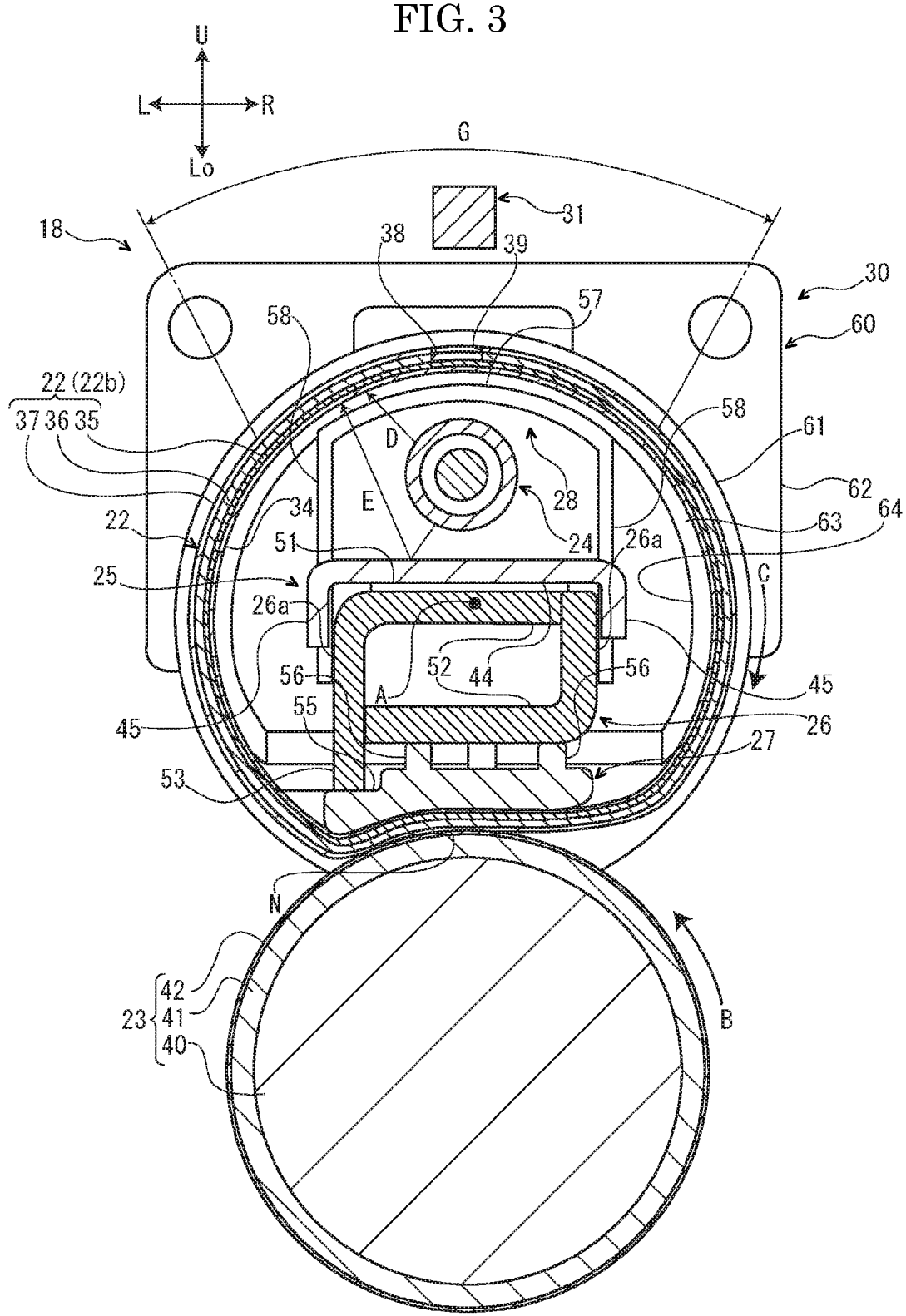
FIG. 3 is a sectional view in a cross section crossing a detected region of the fixing belt in the fixing device according to the one embodiment of the present disclosure.
Figure 4:
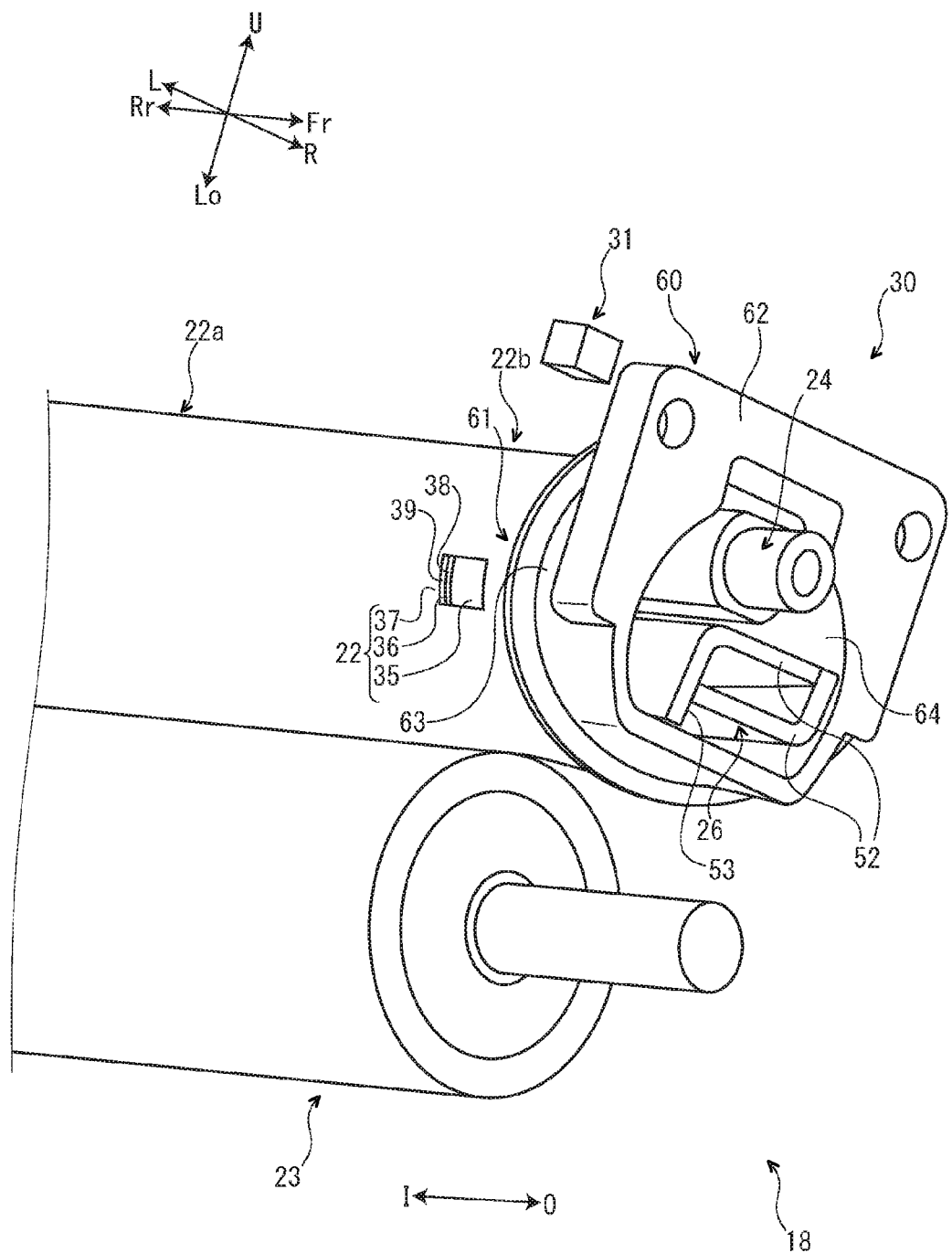
FIG. 4 is a perspective view showing a front end part of the fixing device according to the one embodiment of the present disclosure.

As shown in FIGS. 2 and 3 and other figures, the fixing device 18 includes a fixing belt 22, a pressuring roller 23 (pressuring member) which is arranged below (outer diameter side) the fixing belt 22, a heater 24 (heat source) which is arranged at an inner diameter side of the fixing belt 22, a reflecting plate 25 (reflecting member) which is arranged at the inner diameter side of the fixing belt 22 and below the heater 24, a supporting member 26 which is arranged at the inner diameter side of the fixing belt 22 and below the reflecting plate 25, a pressing member 27 which is arranged at the inner diameter side of the fixing belt 22 and below the supporting member 26, cover members 28 which are fixed to both front and rear end parts of the supporting member 26 at the inner diameter side of the fixing belt 22, shape restricting members 30 which are attached to the both front and rear end parts of the fixing belt 22, and a temperature sensor 31 which is arranged above (outer diameter side) the fixing belt 22.

The fixing belt 22 is formed in a nearly cylindrical shape elongated in the front and rear directions. The fixing belt 22 is provided rotatably around a rotation axis A elongated in the front and rear directions. That is, in the present embodiment, the front and rear directions are a rotation axis direction of the fixing belt 22.

The fixing belt 22 has flexibility, and is endless in a circumferential direction. The fixing belt 22 includes a base material layer 35, an elastic layer 36 which is provided around this base material layer 35 and a release layer 37 which covers this elastic layer 36, for example. The base material layer 35 of the fixing belt 22 is made of a metal, such as SUS. In addition, the base material layer 35 of the fixing belt 22 may be made of a resin, such as PI (polyimide). The elastic layer 36 of the fixing belt 22 is made of a silicon rubber, for example. The thickness of the elastic layer 36 of the fixing belt 22 is 200 μm, for example. The release layer 37 of the fixing belt 22 is made of a PFA tube, for example. The thickness of the release layer 37 of the fixing belt 22 is 10 μm, for example. In an inner circumferential face of the fixing belt 22, a coating layer 34 is provided in order to improve slidability and thermal absorptivity of the fixing belt 22. The coating layer 34 is formed of a single material.

Figure 5:
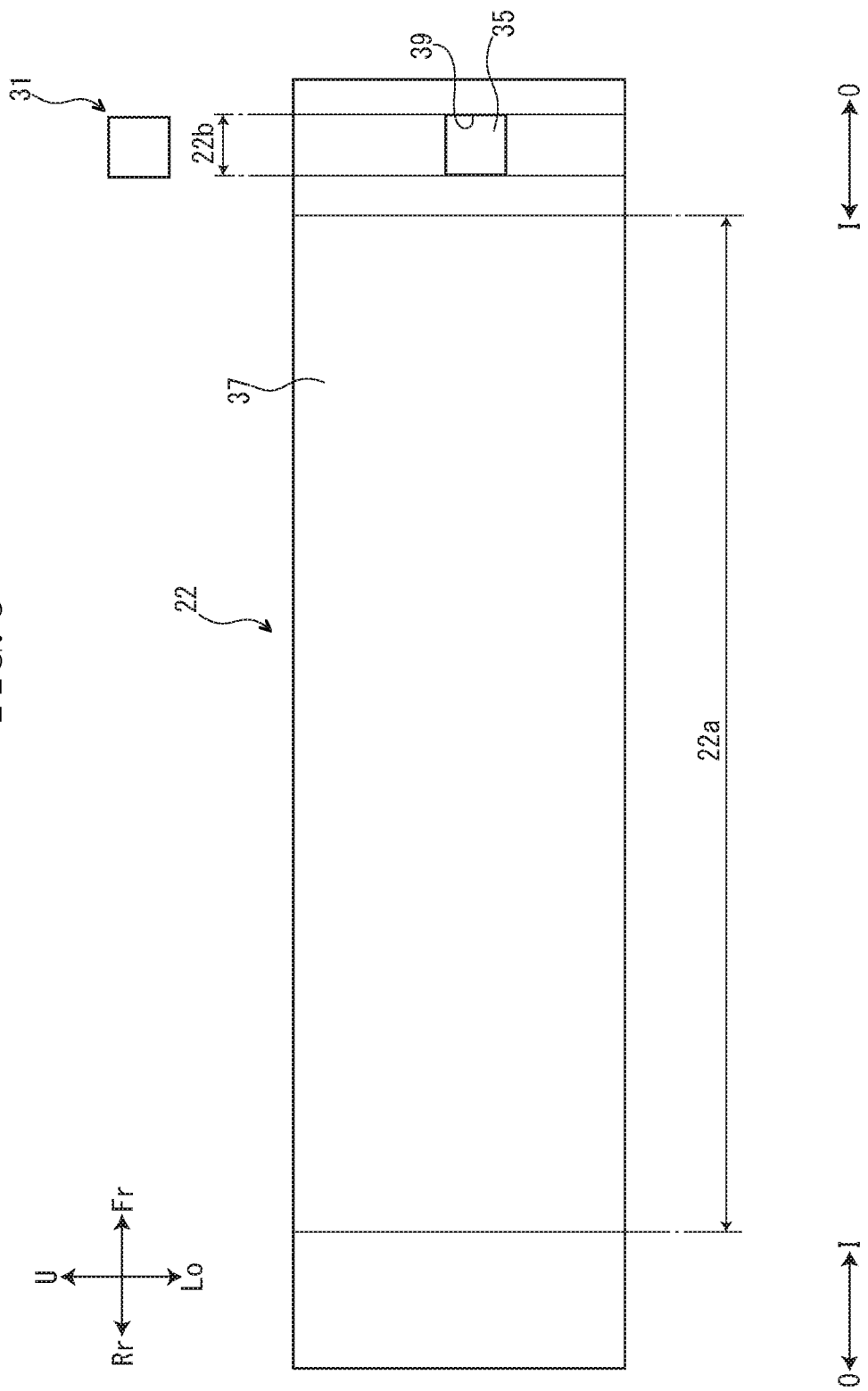
FIG. 5 is a side view showing the fixing belt and a temperature sensor in the fixing device according to the one embodiment of the present disclosure.

As shown in FIG. 5 and other figures, the fixing belt 22 is provided with a sheet passing region 22a. The sheet passing region 22a is a region through which sheets of a maximum size pass. The fixing belt 22 is provided with a detected region 22b at a front side of the sheet passing region 22a (outsides of the sheet passing region 22a in the front and rear directions).

As shown in FIG. 3 and other figures, the base material layer 35 of the detected region 22b of the fixing belt 22 has no holes. The elastic layer 36 of the detected region 22b has a hole 38 in apart thereof in a circumferential direction. The hole 38 penetrates from an outer circumferential face to an inner circumferential face of the elastic layer 36 of the detected region 22b. The hole 38 is formed by peeling a part of the elastic layer 36 of the detected region 22b, for example. The release layer 37 of the detected region 22b has a through hole 39 in a position corresponding to the hole 38 of the elastic layer 36 of the detected region 22b. The through hole 39 penetrates from an outer circumferential face to an inner circumferential face of the release layer 37 of the detected region 22b. The through hole 39 is formed by peeling a part of the release layer 37 of the detected region 22b, for example. By the configuration described above, a part of the outer circumferential face of the base material layer 35 of the detected region 22b is exposed to an outer circumference side of the fixing belt 22 (see FIG. 4, FIG. 5 and other figures).

As shown in FIG. 2, FIG. 3 and other figures, the pressuring roller 23 is formed in a nearly columnar shape elongated in the front and rear directions. The pressuring roller 23 comes into pressure contact with the fixing belt 22 so as to form a fixing nip N between the fixing belt 22 and the pressuring roller 23. The pressuring roller 23 is rotatably provided.

The pressuring roller 23 includes a columnar core material 40, an elastic layer 41 which is provided around this core material 40 and a release layer 42 which covers this elastic layer 41, for example. The core material 40 of the pressuring roller 23 is made of a metal, such as iron. The elastic layer 41 of the pressuring roller 23 is made of a silicon rubber, for example. The release layer 42 of the pressuring roller 23 is made of a PFA tube, for example.

The heater 24 is configured as a halogen heater, for example. The heater 24 is arranged at an upper part (a part at a far side from the pressuring roller 23) in an internal space of the fixing belt 22, and is provided at a position displaced upward (the far side from the pressuring roller 23) from the rotation axis A of the fixing belt 22. Hence, in the present embodiment, an upper end part 22a of the fixing belt 22 is a part of the fixing belt 22 which is the closest to the heater 24 and whose temperature is most likely to rise.

The reflecting plate 25 is formed in a shape elongated in the front and rear directions. The reflecting plate 25 is made of a metal, such as an aluminum alloy for brightness. The reflecting plate 25 is arranged between the heater 24 and the supporting member 26. A cross section of the reflecting plate 25 is formed in a U shape which protrudes upward (a far side from the pressuring roller 23).

The reflecting plate 25 includes a main body part 44 which is provided nearly horizontally, and guide parts 45 which are bent downward from both left and right end parts (end parts at an upstream side and a downstream side in the sheet conveying direction) of the main body part 44. A top face of the main body part 44 is a reflection face (mirror face) which faces the heater 24, and reflects radiation heat radiated from the heater 24, to an inner circumferential face of the fixing belt 22.

The supporting member 26 is formed in a shape elongated in the front and rear directions. An upper part of the supporting member 26 is inserted between the guide parts 45 of the reflecting plate 25. The supporting member 26 supports the reflecting plate 25 via a spacer 51, and is not in direct contact with the reflecting plate 25.

The supporting member 26 is formed by combining a pair of L-shaped sheet metals 52 made of SECC (galvanized steel plate) or the like, and has a nearly rectangular cross-sectional shape. At a lower left corner part of the supporting member 26, an engaging protrusion 53 which protrudes downward is formed. The engaging protrusion 53 is formed by elongating one of the sheet metals 52 downward. Both side walls 26a of the supporting member 26 extend along upper and lower directions and are provided in parallel each other. According to this, the supporting member 26 has a contour of a substantially rectangular shape.

The pressing member 27 is formed in a long flat shape in the front and rear directions. The pressing member 27 is made of a heat-resistant resin, such as an LCP (Liquid Crystal Polymer). At a left end part of a top face of the pressing member 27, an engaging convex part 55 is formed. With the engaging convex part 55, the engaging protrusion 53 of the supporting member 26 engages. In the top face of the pressing member 27, a plurality of bosses 56 are protruded. An upper end part of each boss 56 comes into contact with a lower face of the supporting member 26. According to the above-mentioned configuration, the supporting member 26 supports the pressing member 27, and restricts a warp of the pressing member 27.

A left side part (a part at a downstream side in the sheet conveying direction) of the lower face of the pressing member 27 is inclined downward (toward the pressuring roller 23) from the right side (an upstream side in the sheet conveying direction) to the left side (the downstream side in the sheet conveying direction). The lower face of the pressing member 27 presses the fixing belt 22 downward (toward the pressuring roller 23).

Each cover member 28 includes a curved part 57 which is curved upward in an arc shape, and attachment parts 58 which are bent downward from both left and right end parts (end parts at the upstream side and the downstream side in the sheet conveying direction) of the curved part 57. The curved part 57 is arranged along the inner circumferential face of the fixing belt 22. A lower end part of each attachment part 58 is attached to each one of both left and right side faces of the supporting member 26.

Each shape restricting member 30 is arranged closer to the outside in the front and rear directions than each cover member 28. Each shape restricting member 30 includes a restricting piece 60 and a ring piece 61 which is attached to the restricting piece 60.

The restricting piece 60 of each shape restricting member 30 includes a base part 62, and an insertion part 63 which is protruded on a face at the inside in the front and rear directions of the base part 62. A through-hole 64 which penetrates the base part 62 and the insertion part 63 is provided at the restricting piece 60 along the front and rear directions, and the heater 24 and the supporting member 26 penetrate this through-hole 64. The insertion part 63 of the restricting piece 60 of each shape restricting member 30 is curved along an outer circumference of the through-hole 64, and is formed in a nearly arc shape (downward C shape). The insertion part 63 is inserted into the both front and rear end parts of the fixing belt 22. Consequently, the shape of the fixing belt 22 is restricted (deformation of the fixing belt 22 is prevented).

The ring piece 61 of each shape restricting member 30 is formed in an annular shape. The ring piece 61 is attached to an outer circumference of the insertion part 63 of the restricting piece 60. The ring piece 61 is arranged at the outside in the front and rear directions of the both front and rear end parts of the fixing belt 22, and restricts meandering (movement to the outside in the front and rear directions) of the fixing belt 22. The upper part of the ring piece 61 is arranged at the inside in the front and rear directions of the base part 62 of the restricting piece 60, and thereby restricts movement of the ring piece 61 to the outside in the front and rear directions.

The temperature sensor 31 is provided in a noncontact manner with the fixing belt 22. The temperature sensor 31 is constructed of, for example, a thermopile, and has a function of detecting radiant heat radiated from the detected region 22b of the fixing belt 22. The temperature sensor 31 faces the circumferential face of an upper end part of the fixing belt 22.

Next, a control system of the fixing device 18 will be described.

Figure 6:
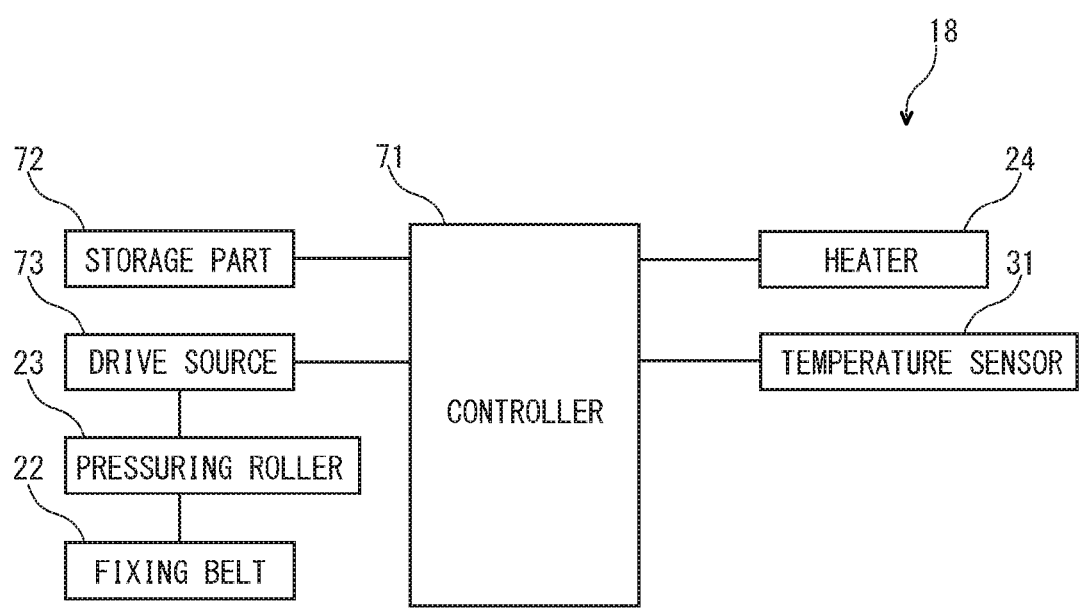
FIG. 6 is a block diagram showing a control system of the fixing device according to the one embodiment of the present disclosure.

As shown in FIG. 6, the fixing device 18 includes a controller 71 (CPU). The controller 71 is connected to a storage part 72 which is configured as a storage device, such as a ROM or a RAM, and the controller 71 is configured to control each part of the fixing device 18 based on a control program or control data stored in the storage part 72.

The controller 71 is connected to a drive source 73 configured as a motor or the like, and the drive source 73 is connected to the pressuring roller 23. In addition, when the drive source 73 rotates the pressuring roller 23 based on a signal from the controller 71, the fixing belt 22 coming into pressure contact with the pressuring roller 23 is configured to co-rotate in an opposite direction to the pressuring roller 23. That is, the drive source 73 is configured to rotate the fixing belt 22 and the pressuring roller 23.

The controller 71 is connected to the heater 24. In addition, the heater 24 is configured to be operated based on the signal from the controller 71.

The controller 71 is connected to the temperature sensor 31, upon detecting the temperature of the detected region 22b of the fixing belt 22 by the temperature sensor 31, the temperature of the detected region 22b of the fixing belt 22 detected by the temperature sensor 31 (hereinafter, referred to as "temperature detected by the temperature sensor 31") is inputted into the controller 71.

To fix a toner image on a sheet in the fixing device 18 applying the above-mentioned configuration, the drive source 73 rotates the pressuring roller 23 (see arrow B in FIGS. 2 and 3). When the pressuring roller 23 is rotated in this way, the fixing belt 22 which comes into pressure contact with the pressuring roller 23 is driven to rotate in a direction opposite to a direction of the pressuring roller 23 (see arrow C in FIG. 2). When the fixing belt 22 is rotated in this way, the fixing belt 22 slides along the pressing member 27.

Further, to fix a toner image on a sheet, the heater 24 is operated. When the heater 24 is operated in this way, the heater 24 radiates radiation heat. Part of the radiation heat radiated from the heater 24 is directly radiated on and is absorbed in the inner circumferential face of the fixing belt 22 as indicated by arrow D in FIGS. 2 and 3. Further, as indicated by arrow E in FIGS. 2 and 3, another part of the radiation heat radiated from the heater 24 is reflected toward the inner circumferential face of the fixing belt 22 on the top face of the main body part 44 of the reflecting plate 25, and is absorbed in the inner circumferential face of the fixing belt 22. According to the above-mentioned function, the heater 24 heats the fixing belt 22. When the sheet passes through the fixing nip N in this state, the toner image is heated, is melted and is fixed to the sheet.

In the present embodiment, a configuration in which the fixing belt 22 having a small heat capacity is directly heated by the heater 24 is employed. Therefore, when the heater 24 causes a runaway, the heater 24 heats the fixing belt 22 in a state in which the fixing belt 22 is not rotated, and thus there is a risk that the temperature of the fixing belt 22 (particularly, an upper end part of the fixing belt 22) excessively rises.

In addition, in the present embodiment, a configuration in which the fixing belt 22 is co-rotated with the rotation the pressuring roller 23 is employed. In employing such a configuration, when driving torque of the fixing belt 22 (torque necessary for sliding the fixing belt 22 with respect to the pressing member 27) increases, it becomes difficult to co-rotate the fixing belt 22 with the rotation of the pressuring roller 23. Therefore, similar to the case in which the heater 24 causes a runaway, the heater 24 heats the fixing belt 22 in a state in which the fixing belt 22 is not rotated, and thus there is a risk that the temperature of the fixing belt 22 excessively rises.

Accordingly, in the present embodiment, in the following manners, heating of the fixing belt 22 by the heater 24 in a state that the fixing belt 22 is not rotated is prevented.

As described above, the elastic layer 36 of the detected region 22b of the fixing belt 22 has a hole 38 in a part thereof in the circumferential direction. With this, a part in which the hole 38 is provided in the elastic layer 36 of the detected region 22b (hereinafter, referred to as "a hole forming part of the detected region 22b") has smaller heat capacity than parts other than the hole forming part of the detected region 22b (hereinafter, referred to as "other parts of the detected region 22b"). Therefore, when the heater 24 heats the detected region 22b, the temperature of the hole forming part of the detected region 22b more rapidly rises than the other parts of the detected region 22b.

Figure 7:
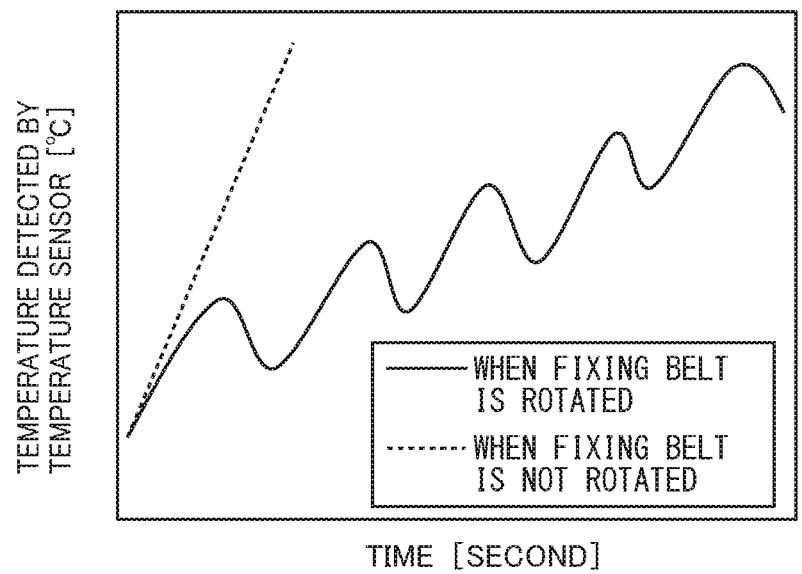
FIG. 7 is a graph showing temperatures detected by the temperature sensor when the fixing belt is rotated and is not rotated in the fixing device according to the one embodiment of the present disclosure.

Therefore, when the heater 24 heats the fixing belt 22 in a state that the fixing belt 22 is rotated, the temperature sensor 31 alternately detects the temperature of the hole forming part of the detected region 22b (a part having a higher temperature) and the temperature of the other parts of the detected region 22b (a part having a lower temperature), thereby the temperature detected by the temperature sensor 31 alternately increases and decreases (see a solid line in FIG. 7). In this case, the controller 71 judges that the fixing belt 22 is rotated, and continues to operate the heater 24.

On the other hand, when the heater 24 heats the fixing belt 22 in a state that the fixing belt 22 is not rotated, the temperature sensor 31 continues to detect only either the temperature of the hole forming part of the detected region 22b (a part having a higher temperature) or the temperature of the other parts of the detected region 22b (a part having a lower temperature). Therefore, the temperature detected by the temperature sensor 31 does not alternately increase and decrease, and continues to increase (see the dotted line in FIG. 7). In this case, the controller 71 judges that the fixing belt 22 is not rotated, and stops to operate the heater 24.

In the present embodiment, using such a simple configuration enables judging whether the fixing belt 22 is rotated or not, and operating the heater 24 only when the fixing belt 22 is rotated.

In addition, the controller 71 controls the drive source 73 such that the rotation of the fixing belt 22 is stopped in a position where the hole 38 of the elastic layer 36 of the detected region 22b faces the temperature sensor 31 (see FIG. 3) when the controller 71 stops the rotation of the fixing belt 22. Specifically, the controller 71 calculates a rotation cycle of the fixing belt 22 based on the temperature detected by the temperature sensor 31, expects a timing in which the hole 38 of the elastic layer 36 of the detected region 22b faces the temperature sensor 31 based on the calculated rotation cycle, and determines a timing in which the rotation of the fixing belt 22 is stopped (a timing in which driving of the drive source 73 is stopped). Employing such a configuration allows the rotation of the fixing belt 22 to be always started in a position in which the hole 38 of the elastic layer 36 of the detected region 22b faces the temperature sensor 31 (see FIG. 3). Therefore, in a case where the heater 24 heats the fixing belt 22 in a state that the fixing belt 22 is not rotated, the temperature sensor 31 detects the temperature of the base material layer 35 of the fixing belt 22 exposed via the hole 38 of the elastic layer 36 of the detected region 22b. The base material layer 35 of the fixing belt 22 has a small heat capacity and the temperature of the base material layer 35 of the fixing belt 22 rapidly increases, and thus the increasing rate of the temperature detected by the temperature sensor 31 also becomes higher. This enables quick detection of an abnormal rotation of the fixing belt 22.

In addition, the temperature sensor 31 faces an outer circumferential face of the upper end part of the fixing belt 22 (a part of the fixing belt 22 which is the closest to the heater 24 and whose temperature is the most likely to rise). That enables further quick detection of an abnormal rotation of the fixing belt 22.

In addition, the hole 38 penetrates from the outer circumferential face to the inner circumferential face of the elastic layer 36 of the detected region 22b. Employing such a configuration makes it possible for the hole 38 to be easily provided in the elastic layer 36 of the detected region 22b.

In addition, in the fixing device 18 configured as described above, in a case where a difference between a linear velocity of the fixing belt 22 before a sheet passes through the fixing nip N and a linear velocity of the fixing belt 22 during the period of time a sheet passes through the fixing nip N becomes large, there is a risk that an unfavorable image is generated. Therefore, it is necessary to check if the rotation of the fixing belt 22 is stable (the rotation speed of the fixing belt 22 is no less than a constant speed). Accordingly, in the present embodiment, if the rotation of the fixing belt 22 is stable or not is judged in the following procedures.

Figure 8:
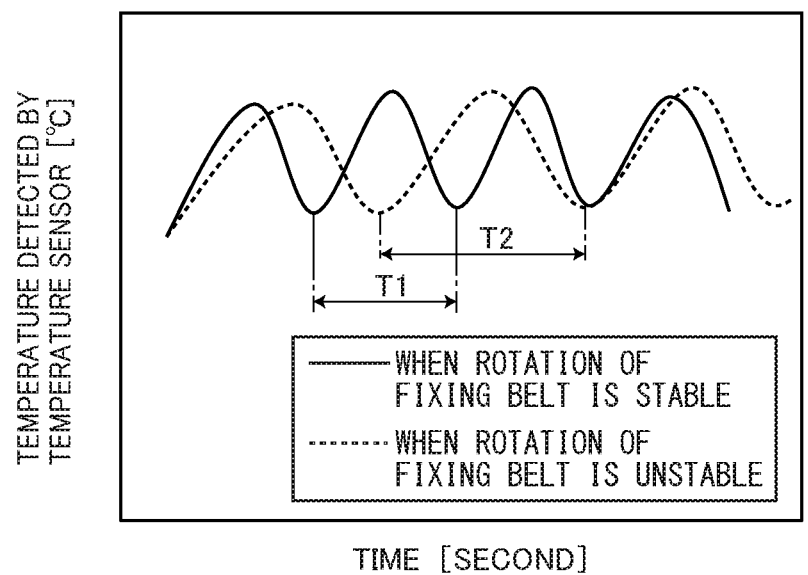
FIG. 8 is a graph showing temperatures detected by the temperature sensor when the rotation of the fixing belt is stable and unstable in the fixing device according to the one embodiment of the present disclosure.

In a case where the rotation of the fixing belt 22 is stable, the rotation speed of the fixing belt 22 is always no less than a constant speed. Therefore, the rotation cycle of the fixing belt 22 is always no less than a constant time. According to this, a cycle T1 in which the temperature detected by the temperature sensor 31 increases and decreases (see FIG. 8) is no more than a threshold Tth stored in a storage part 72. In such a case, the controller 71 judges that the rotation of the fixing belt 22 is stable.

On the other hand, in a case where the rotation of the fixing belt 22 is unstable, the rotation speed of the fixing belt 22 is temporarily or always less than a constant speed. Therefore, the rotation cycle of the fixing belt 22 temporarily or always exceeds constant time. According to this, a cycle T2 in which the temperature detected by the temperature sensor 31 increases and decreases (see FIG. 8) temporarily or always exceeds the threshold Tth stored in the storage part 72. In such a case, the controller 71 judges that the rotation of the fixing belt 22 is unstable. In the present embodiment, as described above, using a simple configuration enables not only judgement if the fixing belt 22 is rotated or not, but also if the rotation of the fixing belt 22 is stable or not.

Figure 9:
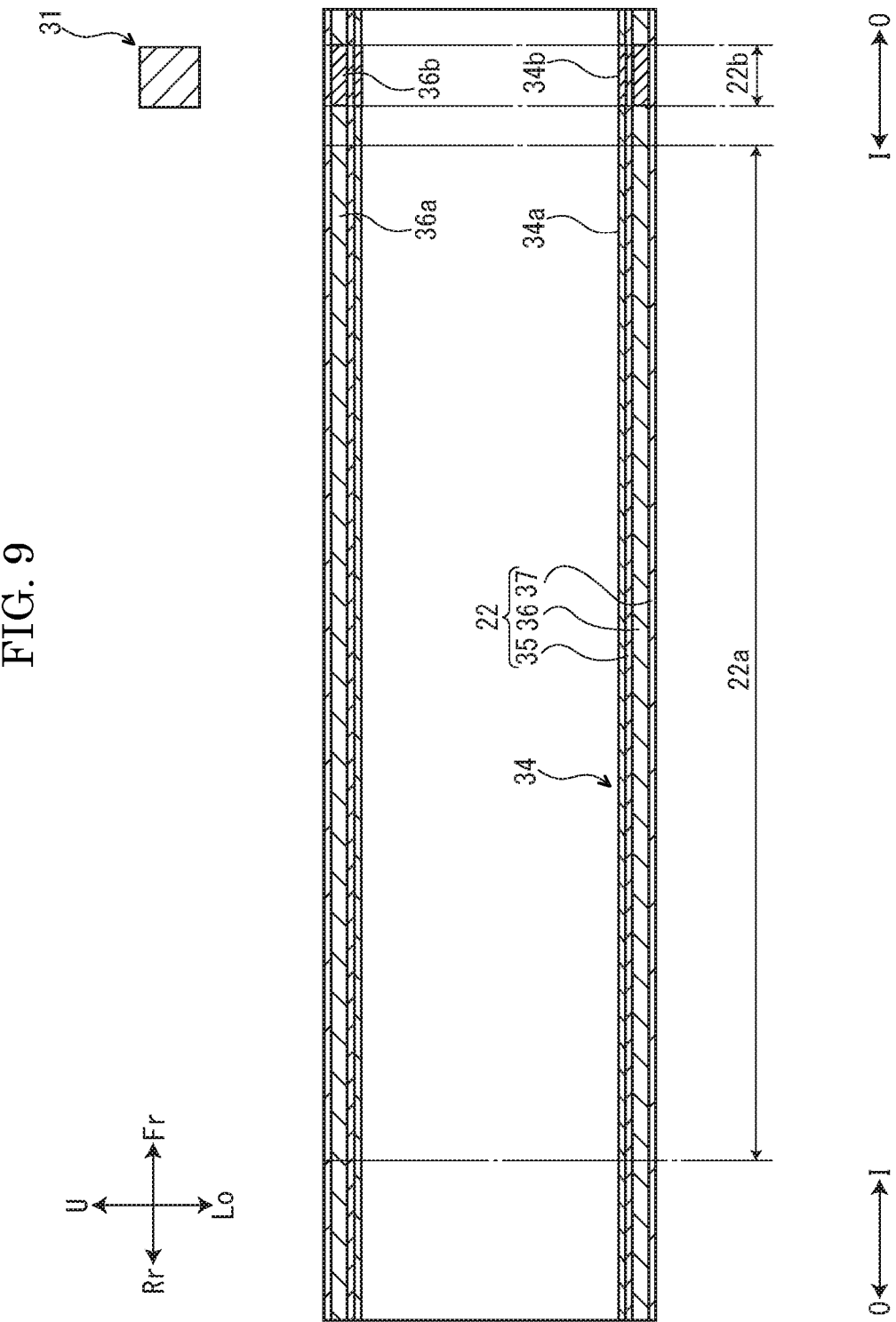
FIG. 9 is a sectional view showing the fixing belt and the temperature sensor in a fixing device according to another different embodiment of the present disclosure.

In the present embodiment, a case in which the elastic layer 36 of the fixing belt 22 is formed of a single material (silicon rubber) has been described. Meanwhile, in the other different embodiments, as shown in FIG. 9, the elastic layer 36b of the detected region 22b may be formed of a different material from the elastic layer 36a of regions other than the detected region 22b. For example, if the elastic layer 36b of the detected region 22b is formed of a material having higher thermal conductivity than the elastic layer 36a of regions other than the detected region 22b, the thermal conductivity of the elastic layer 36b of the detected region 22b can be higher than the thermal conductivity of the elastic layer 36a of the regions other than the detected region 22b. This enables a rapid increase in the temperature of the detected region 22b and quick detection of an abnormal rotation of the fixing belt 22.

In the present embodiment the configuration of the coating layer 34 of the fixing belt 22 has not been particularly described. Meanwhile, in the other different embodiments, as shown in FIG. 9, a coating layer 34b of the detected region 22b may be formed of a different material from a coating layer 34a of regions other than the detected region 22b. For example, if the coating layer 34b of the detected region 22b is formed of a material having higher thermal absorptivity than the coating layer 34a of regions other than the detected region 22b, the thermal absorptivity of the inner circumferential face of the detected region 22b can be higher than the thermal absorptivity of the inner circumferential face of the regions other than the detected region 22b. That enables a rapid increase in the temperature of the detected region 22b and quick detection of an abnormal rotation of the fixing belt 22.

Figure 10:
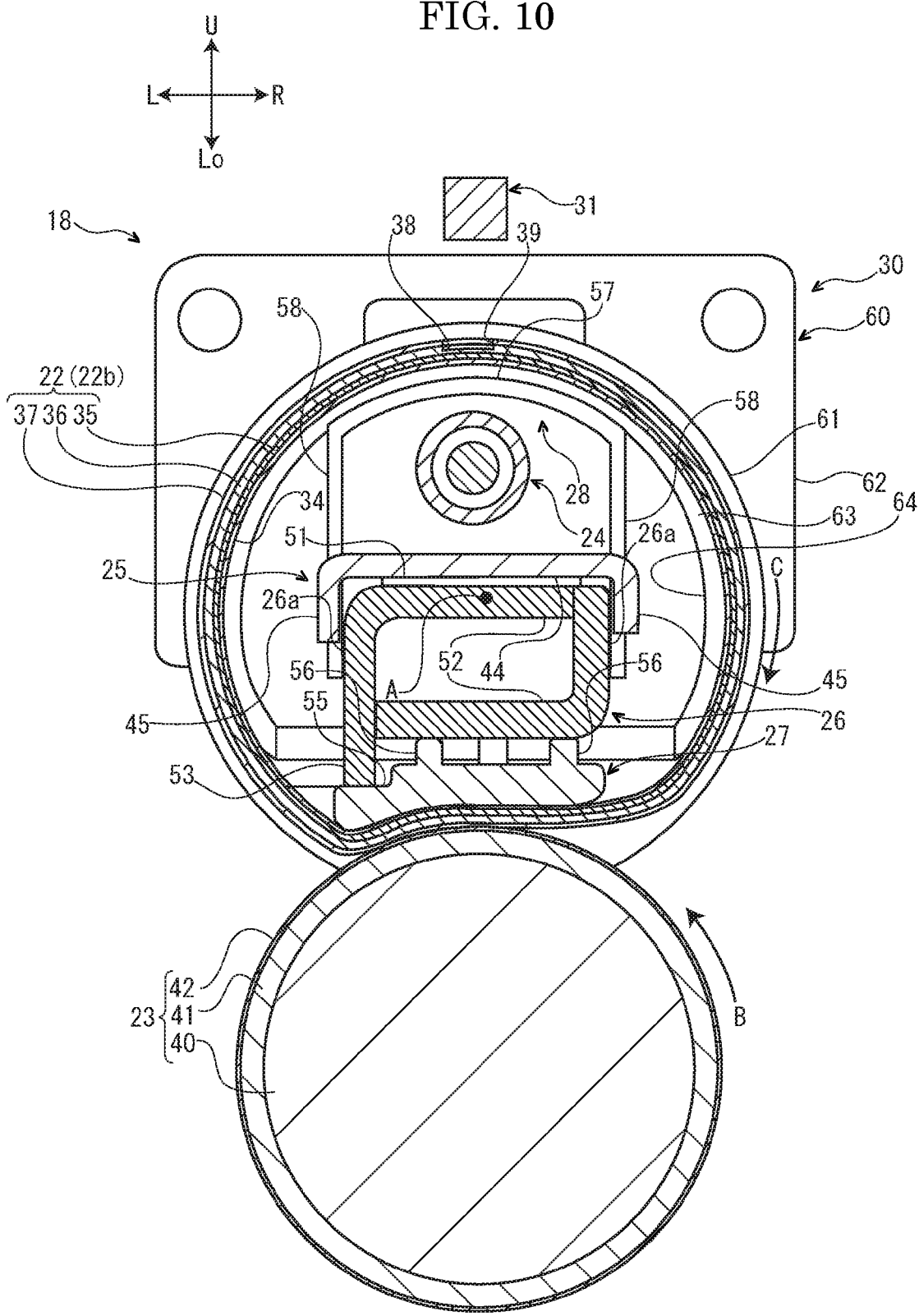
FIG. 10 is a sectional view showing a cross section crossing a detected region of a fixing belt in a fixing device according to still another different embodiment of the present disclosure.

In the present embodiment, a case in which the hole 38 penetrates from the outer circumferential face to the inner circumferential face of the elastic layer 36 of the detected region 22b has been described. Meanwhile, in the other different embodiments, as shown in FIG. 10, the hole 38 may be formed in the outer circumferential face of the elastic layer 36 of the detected region 22b so as to be concaved and may not penetrate from the outer circumferential face to the inner circumferential face of the elastic layer 36 of the detected region 22b. Employing such a configuration enables prevention of a decrease in strength of the detected region 22b due to providing the hole 38 of the elastic layer 36 of the detected region 22b.

In the present embodiment, a case in which the outer circumferential face of the upper end part of the fixing belt faces the temperature sensor 31 has been described. Meanwhile, in the other different embodiments, an outer circumferential face of parts other than the upper end part of the fixing belt 22 may face the temperature sensor 31. In addition, as shown by an arrow G in FIG. 3, an outer circumferential face of a part with which radiant heat is directly radiated from the heater 24 of the fixing belt 22 (in the present embodiment, upper part of the fixing belt 22) preferably faces the temperature sensor 31. Employing such a configuration enables detection of the temperature of a part in which the temperature rapidly increases of the fixing belt 22 by the temperature sensor 31. That enables quick detection of an abnormal rotation of the fixing belt 22.

In the present embodiment, a case in which the temperature sensor 31 is constructed of a thermopile has been described. Meanwhile, in the other different embodiments, a noncontact thermistor or the like may be used as the temperature sensor 31.

In the present embodiment, a case where the heater 24 is constructed of the halogen heater has been described. Meanwhile, in the other different embodiments, a ceramic heater or the like may be used as the heater 24.

In the present embodiment, a case where the configuration of the present disclosure is applied to the printer 1 has been described. Meanwhile, in the other different embodiments, the configuration of the disclosure may be applied to another image forming apparatus, such as a copying machine, a facsimile or a multifunction peripheral.

While the present disclosure has been described with reference to the particular illustrative embodiments, it is not to be restricted by the embodiments. It is to be appreciated that those skilled in the art can change or modify the embodiments without departing from the scope and spirit of the present disclosure.

What is claimed is:

1. A fixing device comprising:
    a fixing belt configured to be rotatable;
    a pressuring member configured to be rotatable and to come into pressure contact with the fixing belt so as to form a fixing nip;
    a heat source configured to heat the fixing belt;
    a pressing member configured to press the fixing belt to a side of the pressuring member;
    a temperature sensor configured to detect a temperature of the fixing belt; and
    a controller into which the temperature detected by the temperature sensor is inputted,
    wherein the fixing belt includes a base material layer and an elastic layer provided around the base material layer, wherein a detected region whose temperature is detected by the temperature sensor is formed in the fixing belt, and the elastic layer of the detected region is provided with a hole in a part thereof in a circumferential direction, and wherein the controller judges that the fixing belt is rotating in a case where the temperature detected by the temperature sensor alternately increases and decreases in a state that the heat source is heating the fixing belt, and judges that the fixing belt is not rotating in a case where the temperature detected by the temperature sensor does not alternately increase and decrease in the state that the heat source is heating the fixing belt, the fixing device further comprising a drive source configured to rotate the fixing belt, wherein the controller controls the drive source such that a rotation of the fixing belt is stopped in a position where the hole of the elastic layer of the detected region faces the temperature sensor.

2. The fixing device according to claim 1,
wherein the heat source is placed at an inner diameter side of the fixing belt, and
wherein the temperature sensor faces an outer circumferential face of one part of the fixing belt, and radiation heat from the heat source is directly radiated to the one part thereof.

3. The fixing device according to claim 1,
wherein the hole of the elastic layer of the detected region penetrates from an outer circumferential face to an inner circumferential face of the elastic layer of the detected region.

4. The fixing device according to claim 1,
wherein the hole of the elastic layer of the detected region is formed on an outer circumferential face of the elastic layer of the detected region, and does not penetrate from the outer circumferential face to an inner circumferential face of the elastic layer of the detected region.

5. The fixing device according to claim 1,
wherein the controller judges that rotation of the fixing belt is stable in a case where a cycle in which the temperature detected by the temperature sensor increases and decreases is not more than a threshold, and judges that the rotation of the fixing belt is unstable in a case where the cycle in which the temperature detected by the temperature sensor increases and decreases exceeds the threshold.

6. The fixing device according to claim 1,
wherein the fixing belt is configured to be rotatable around a rotation axis and has a sheet passing region through which a sheet passes, and
wherein the detected region is provided outside of the sheet passing region in the rotation axis direction.

7. The fixing device according to claim 1, further comprising a supporting member configured to support the pressing member.

8. An image forming apparatus comprising the fixing device according to claim 1.

9. A fixing device comprising:
a fixing belt configured to be rotatable;
a pressuring member configured to be rotatable and to come into pressure contact with the fixing belt so as to form a fixing nip;
a heat source configured to heat the fixing belt;
a pressing member configured to press the fixing belt to a side of the pressuring member;
a temperature sensor configured to detect a temperature of the fixing belt; and
a controller into which the temperature detected by the temperature sensor is inputted,
wherein the fixing belt includes a base material layer and an elastic layer provided around the base material layer,
wherein a detected region whose temperature is detected by the temperature sensor is formed in the fixing belt, and the elastic layer of the detected region is provided with a hole in a part thereof in a circumferential direction, and
wherein the controller judges that the fixing belt is rotating in a case where the temperature detected by the temperature sensor alternately increases and decreases in a state that the heat source is heating the fixing belt, and judges that the fixing belt is not rotating in a case where the temperature detected by the temperature sensor does not alternately increase and decrease in the state that the heat source is heating the fixing belt,
wherein the heat source is placed at an inner diameter side of the fixing belt, and
wherein an inner circumferential face of the detected region has higher thermal absorptivity than an inner circumferential face of regions other than the detected region of the fixing belt.

10. An image forming apparatus comprising the fixing device according to claim 9.

11. A fixing device comprising:
a fixing belt configured to be rotatable;
a pressuring member configured to be rotatable and to come into pressure contact with the fixing belt so as to form a fixing nip;
a heat source configured to heat the fixing belt;
a pressing member configured to press the fixing belt to a side of the pressuring member;
a temperature sensor configured to detect a temperature of the fixing belt; and
a controller into which the temperature detected by the temperature sensor is inputted,
wherein the fixing belt includes a base material layer and an elastic layer provided around the base material layer,
wherein a detected region whose temperature is detected by the temperature sensor is formed in the fixing belt, and the elastic layer of the detected region is provided with a hole in a part thereof in a circumferential direction, and
wherein the controller judges that the fixing belt is rotating in a case where the temperature detected by the temperature sensor alternately increases and decreases in a state that the heat source is heating the fixing belt, and judges that the fixing belt is not rotating in a case where the temperature detected by the temperature sensor does not alternately increase and decrease in the state that the heat source is heating the fixing belt,
wherein the elastic layer of the detected region has higher thermal conductivity than the elastic layer of regions other than the detected region of the fixing belt.

12. An image forming apparatus comprising the fixing device according to claim 11.

* * * * *